(12) United States Patent
Storey

(10) Patent No.: US 11,684,021 B2
(45) Date of Patent: Jun. 27, 2023

(54) VERTICAL HYDROPONIC PLANT PRODUCTION APPARATUS

(71) Applicant: University of Wyoming, Laramie, WY (US)

(72) Inventor: Nathaniel R. Storey, Laramie, WY (US)

(73) Assignee: University of Wyoming, Laramie, WY (US)

( * ) Notice: Subject to any disclaimer, the term of this patent is extended or adjusted under 35 U.S.C. 154(b) by 0 days.

(21) Appl. No.: 17/197,503

(22) Filed: Mar. 10, 2021

(65) Prior Publication Data

US 2021/0185939 A1    Jun. 24, 2021

Related U.S. Application Data

(63) Continuation of application No. 15/284,688, filed on Oct. 4, 2016, now abandoned, which is a continuation
(Continued)

(51) Int. Cl.
*A01G 31/02* (2006.01)
*A01G 9/04* (2006.01)
(Continued)

(52) U.S. Cl.
CPC .............. *A01G 9/047* (2013.01); *A01G 18/00* (2018.02); *A01G 24/30* (2018.02); *A01G 31/02* (2013.01);
(Continued)

(58) Field of Classification Search
CPC .......... A01G 9/02; A01G 9/047; A01G 9/022; A01G 9/10; A01G 25/02; A01G 25/023;
(Continued)

(56) References Cited

U.S. PATENT DOCUMENTS 2,152,869 A    4/1939    Campbell
2,292,619 A    8/1942    De
(Continued)

FOREIGN PATENT DOCUMENTS

GB    2265536 A    10/1993
GB    2265536 B    8/1995
(Continued)

OTHER PUBLICATIONS

Australian Application No. 2010281721 search report dated Sep. 22, 2014.
(Continued)

*Primary Examiner* — Joshua J Michener
*Assistant Examiner* — Morgan T Jordan
(74) *Attorney, Agent, or Firm* — Weatherly IP Solutions, LLC; James M. Weatherly

(57) ABSTRACT

A hydroponic plant production apparatus comprising: a hollow grow tube with a slot formed in the front face of the grow tube, and a matrix media insert composed of two halves, where the media is insertable into the grow tube, allowing plants to be inserted and grown between the two halves of the matrix media insert in the grow tube. Methods for use of a hollow grow tube with a slot formed in the front face of the grow tube, and a matrix media insert composed of two halves, where the media is insertable into the grow tube, allowing plants to be inserted and grown between the two halves of the matrix media insert in the grow tube.

9 Claims, 6 Drawing Sheets

Related U.S. Application Data of application No. 13/134,614, filed on Jun. 10, 2011, now Pat. No. 9,491,915, which is a continuation-in-part of application No. 12/804,931, filed on Aug. 2, 2010, now Pat. No. 8,327,582.

(60) Provisional application No. 61/273,317, filed on Aug. 3, 2009.

(51) Int. Cl.
*A01G 24/30* (2018.01)
*A01G 18/00* (2018.01)
*A01G 33/00* (2006.01)
*A01G 24/48* (2018.01)

(52) U.S. Cl.
CPC .............. *A01G 33/00* (2013.01); *A01G 24/48* (2018.02); *Y02P 60/21* (2015.11)

(58) Field of Classification Search
CPC .... A01G 27/005; A01G 31/00; A01G 31/001; A01G 31/02; A01G 2031/002
See application file for complete search history.

(56) References Cited

U.S. PATENT DOCUMENTS

| | | | |
|---|---|---|---|
| 3,368,303 A | 2/1968 | Duncan | |
| 3,579,908 A * | 5/1971 | Morgan | A01G 17/06 256/48 |
| 4,033,072 A | 7/1977 | Kobayashi et al. | |
| 4,035,950 A | 7/1977 | Anselm | |
| 4,070,793 A | 1/1978 | Dillon | |
| 4,095,608 A | 6/1978 | Holmes | |
| 4,118,891 A | 10/1978 | Kehl et al. | |
| 4,175,355 A | 11/1979 | Dedolph | |
| 4,216,617 A | 8/1980 | Schmidt | |
| 4,218,847 A * | 8/1980 | Leroux | A01G 31/06 47/62 C |
| 4,268,994 A | 5/1981 | Urai | |
| 4,310,990 A | 1/1982 | Payne | |
| 4,415,137 A | 11/1983 | Garves | |
| 4,454,684 A | 6/1984 | O'Hare | |
| 4,476,651 A | 10/1984 | Drury | |
| 4,566,607 A | 1/1986 | Smith | |
| 4,594,811 A | 6/1986 | Tokoro | |
| 4,932,158 A | 6/1990 | Roberts | |
| 4,961,284 A * | 10/1990 | Williams | A01G 9/022 47/79 |
| 4,986,027 A | 1/1991 | Harvey | |
| 5,097,627 A | 3/1992 | Roberts | |
| 5,276,997 A * | 1/1994 | Swearengin | A01G 9/022 47/82 |
| 5,293,713 A | 3/1994 | Ahmed | |
| 5,363,594 A | 11/1994 | Davis | |
| 5,381,625 A * | 1/1995 | Wente | A01G 9/022 47/82 |
| 5,490,374 A | 2/1996 | Calande | |
| 5,555,676 A | 9/1996 | Lund | |
| 5,987,812 A | 11/1999 | Knell | |
| 6,000,173 A * | 12/1999 | Schow | A01G 31/02 47/60 |
| D420,554 S | 2/2000 | Evans | |
| 6,021,602 A * | 2/2000 | Orsi | A01G 31/02 47/62 A |
| 6,042,630 A | 3/2000 | De Groot | |
| 6,178,692 B1 | 1/2001 | Graven | |
| 6,276,089 B1 * | 8/2001 | Boisclair | A01G 31/02 47/60 |
| 6,314,675 B1 * | 11/2001 | Costa | A01G 31/06 47/62 A |
| 6,397,520 B1 | 6/2002 | Kosinski | |
| 6,502,350 B1 | 1/2003 | Dick | |
| 6,727,091 B2 | 4/2004 | Darlington | |
| 6,751,903 B2 | 6/2004 | Shryock | |
| 6,840,007 B2 | 1/2005 | Leduc et al. | |
| 6,840,008 B1 | 1/2005 | Bullock et al. | |
| 7,188,451 B2 * | 3/2007 | Marchildon | A01G 31/047 47/62 R |
| 7,640,409 B1 | 12/2009 | Stafford et al. | |
| 8,122,642 B1 | 2/2012 | Huberman et al. | |
| 8,327,582 B2 | 12/2012 | Storey | |
| 8,542,823 B1 | 9/2013 | Nguyen et al. | |
| 8,966,815 B1 * | 3/2015 | Smiles | A01G 9/022 47/59 R |
| 9,101,099 B2 | 8/2015 | Nagels et al. | |
| 9,110,963 B2 | 8/2015 | Burchett et al. | |
| 9,380,751 B2 | 7/2016 | Storey | |
| 9,491,915 B2 | 11/2016 | Storey | |
| 9,591,814 B2 | 3/2017 | Collins et al. | |
| 9,807,946 B2 * | 11/2017 | Rajagopalan | A01G 9/025 |
| 9,814,186 B2 * | 11/2017 | Anderson | A01G 7/045 |
| 9,883,642 B2 * | 2/2018 | Friedman | A01G 31/06 |
| 10,123,494 B2 * | 11/2018 | Janssen | B01F 23/23 |
| 10,485,186 B2 | 11/2019 | Storey | |
| 10,638,677 B2 | 5/2020 | Storey | |
| 11,026,378 B2 | 6/2021 | Storey | |
| 2002/0040548 A1 * | 4/2002 | Ware | A01G 31/02 47/83 |
| 2003/0052398 A1 | 3/2003 | Utsumi | |
| 2003/0089037 A1 | 5/2003 | Ware | |
| 2003/0191938 A1 | 10/2003 | Woods et al. | |
| 2004/0003289 A1 | 1/2004 | Bhogal et al. | |
| 2004/0060491 A1 | 4/2004 | Leduc et al. | |
| 2004/0103583 A1 | 6/2004 | Eriksen et al. | |
| 2004/0200148 A1 | 10/2004 | Schuck et al. | |
| 2005/0039397 A1 * | 2/2005 | Roy | A01G 31/02 47/62 R |
| 2005/0055878 A1 | 3/2005 | Dumont | |
| 2005/0055879 A1 | 3/2005 | Darlington | |
| 2005/0169073 A1 | 8/2005 | Cook et al. | |
| 2006/0032128 A1 | 2/2006 | Bryan | |
| 2006/0107589 A1 | 5/2006 | Rubin | |
| 2006/0117656 A1 | 6/2006 | Graham et al. | |
| 2006/0150485 A1 | 7/2006 | Somerville | |
| 2006/0156624 A1 | 7/2006 | Roy et al. | |
| 2006/0162252 A1 | 7/2006 | Lim | |
| 2006/0184540 A1 | 8/2006 | Kung et al. | |
| 2006/0219853 A1 | 10/2006 | Molina et al. | |
| 2006/0231451 A1 | 10/2006 | Takeda et al. | |
| 2007/0062113 A1 | 3/2007 | Rubin et al. | |
| 2007/0144069 A1 | 6/2007 | Gottlieb et al. | |
| 2007/0214717 A1 | 9/2007 | Larwood | |
| 2008/0034653 A1 | 2/2008 | Ramsey et al. | |
| 2008/0184148 A1 | 7/2008 | Selig | |
| 2008/0209804 A1 | 9/2008 | Stradiot | |
| 2009/0056221 A1 | 3/2009 | Ramsey et al. | |
| 2009/0223126 A1 * | 9/2009 | Garner | E04F 13/083 47/65.5 |
| 2009/0249460 A1 | 10/2009 | Fitzgerald et al. | |
| 2009/0288341 A1 | 11/2009 | Kania et al. | |
| 2010/0250892 A1 | 9/2010 | Logan et al. | |
| 2010/0299993 A1 | 12/2010 | Lais et al. | |
| 2010/0318997 A1 | 12/2010 | Li et al. | |
| 2011/0016782 A1 | 1/2011 | Harder | |
| 2011/0061296 A1 | 3/2011 | Simmons | |
| 2011/0120005 A1 * | 5/2011 | King | A01G 24/22 47/62 N |
| 2011/0232188 A1 | 9/2011 | Kennedy | |
| 2012/0066972 A1 * | 3/2012 | Lin | A01G 9/024 47/82 |
| 2012/0173655 A1 | 7/2012 | Mcentee | |
| 2013/0067813 A1 | 3/2013 | Storey | |
| 2013/0268545 A1 | 10/2013 | Burchett et al. | |
| 2013/0305039 A1 | 11/2013 | Gauda | |
| 2014/0115960 A1 | 5/2014 | Kantola et al. | |
| 2014/0130414 A1 * | 5/2014 | Storey | A01G 31/06 47/62 A |
| 2015/0324146 A1 | 11/2015 | Xiao et al. | |
| 2015/0342127 A1 | 12/2015 | Gallant | |
| 2016/0132528 A1 | 5/2016 | Roubaud et al. | |
| 2016/0227722 A1 | 8/2016 | Storey | |

(56) References Cited

U.S. PATENT DOCUMENTS

| | | | |
|---|---|---|---|
| 2017/0171295 A1 | 6/2017 | Sung et al. | |
| 2017/0303478 A1* | 10/2017 | Smith | F21S 4/28 |
| 2018/0000029 A1* | 1/2018 | Martin | A01G 31/06 |
| 2018/0213734 A1* | 8/2018 | Smith | A01G 24/00 |
| 2018/0232396 A1 | 8/2018 | Arab et al. | |

FOREIGN PATENT DOCUMENTS

| | | |
|---|---|---|
| GB | 2343829 A | 5/2000 |
| GB | 2343829 B | 11/2003 |
| WO | 2011016856 A1 | 2/2011 |
| WO | 2016053781 A1 | 4/2016 |

OTHER PUBLICATIONS

European Application No. 10806748.9 search report dated Apr. 21, 2015.
European Patent Office Action, (Application No. 10806748.9) dated Jul. 19, 2016.
European Patent Office Search Report, (Application No. 17195489.4) dated Feb. 28, 2018.
PCT/US2010/02157 search report dated Nov. 16, 2010.
Response to European Patent Office Action, (Application No. 10806748.9) dated Jan. 19, 2017.
U.S. Appl. No. 15/284,688, response to non-final office action dated Apr. 4, 2018.
U.S. Appl. No. 1/284688, response to non-final office action dated Sep. 23, 2019.
U.S. Appl. No. 15/284,688 response to non-final office action dated Oct. 26, 2020.
U.S. Appl. No. 15/284,688, response to non-final office action dated Apr. 17, 2020.
U.S. Appl. No. 15/284,688, response to final office action dated Jan. 15, 2019.
U.S. Appl. No. 15/581,765, ,Karen Panter declaration dated Dec. 3, 2014.
U.S. Appl. No. 15/581,765, response to non-final office action dated Nov. 15, 2017.
U.S. Appl. No. 15/581,765, response to final office action dated Apr. 25, 2018.
U.S. Appl. No. 15/581,765, response to non-final office action dated Nov. 19, 2018.
U.S. Appl. No. 15/582,165 response to non-final office action dated Aug. 16, 2019.
U.S. Appl. No. 15/582,165 response to non-final office action dated Nov. 16, 2017.
U.S. Appl. No. 15/582,165 response to non-final office action dated Oct. 24, 2018.
U.S. Appl. No. 15/284,688, response to non-final office action dated Aug. 20, 2018.

* cited by examiner

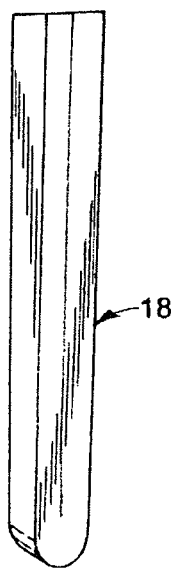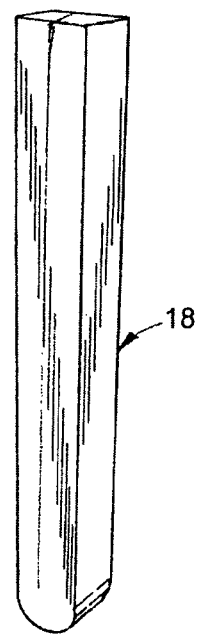
FIG.11
FIG.12

US 11,684,021 B2

VERTICAL HYDROPONIC PLANT PRODUCTION APPARATUS

CROSS REFERENCE TO RELATED APPLICATIONS

The present application is a continuation of pending patent application no. U.S. Ser. No. 15/284,688, filed Oct. 4, 2016, which is a continuation of U.S. Pat. No. 9,491,915, filed Jun. 10, 2011, which is a continuation-in-part of U.S. Pat. No. 8,327,582, filed Aug. 2, 2010, entitled "Vertical Hydroponic Plant Production Apparatus" which claims benefit of priority of provisional patent application Ser. No. 61/273,317, filed on Aug. 3, 2009, entitled "Vertical Hydroponic Plant Production Apparatus", the contents of which are all incorporated by reference.

BACKGROUND OF THE INVENTION

1. Field of the Invention

This invention relates generally to a vertical hydroponic plant production apparatus and, more particularly, the invention relates to a vertical hydroponic plant production apparatus utilizing fibrous, non-woven, air-laden media allowing for vertical hydroponic greenhouse crop production in a fraction of the space necessary for traditional plant production techniques and allowing utilization of vertical surfaces for plant production.

2. Description of the Prior Art

Traditional hydroponics has focused primarily on horizontal production techniques and has been subject to major space constraints. Vertical hydroponic applications have either been impractical, expensive to operate, or inefficient. Often these applications utilize some type of growth medium that is heavy when saturated, causing clogging when filled with plant roots, and/or requiring a great deal of maintenance. In addition, conventional technology makes it difficult to allow in-store display of live, growing vegetables and is not conducive to "you-pick" vegetable and herb sales to customers. Little technology exists that allows vertical plant displays that are highly scalable.

SUMMARY

The present invention is a growing medium for a plant production apparatus utilized in greenhouse crop production. The growing medium comprises a fibrous, non-woven matrix media material wherein the media material is constructed from a plastic material.

In addition, the present invention includes a method for growing plants in a plant production apparatus utilized in greenhouse crop production. The method comprises providing a fibrous, non-woven matrix media material and constructing the media material from a plastic material.

The present invention further includes a growing medium for a plant production apparatus utilized in greenhouse crop production. The growing medium comprises a fibrous, non-woven matrix media material and a silicone binder coating the media material for slowing decomposition and reducing UV damage. The media material is constructed from a plastic material and the media material has sufficient shear strength to be cut into strips and used in hydroponic environments and be free from tearing when pulled.

BRIEF DESCRIPTION OF THE DRAWINGS

FIG. 11 illustrates a media matrix insert with two halves, with the two halves in contact with each other.

FIG. 12 illustrates a media matrix insert with two halves, with the two halves in contact with each other.

DETAILED DESCRIPTION OF THE PREFERRED EMBODIMENTS

Figure 1:
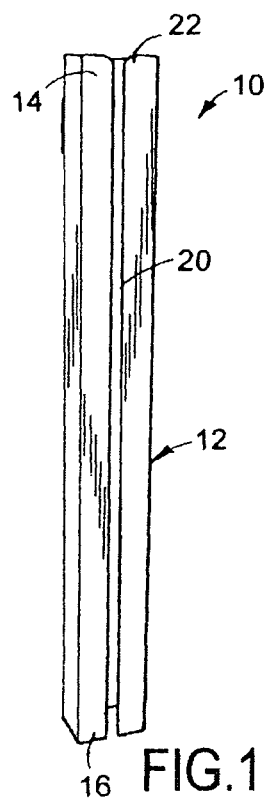
FIG. 1 is a front perspective view illustrating a grow tube of a vertical hydroponic plant production apparatus, constructed in accordance with the present invention.
Figure 2:
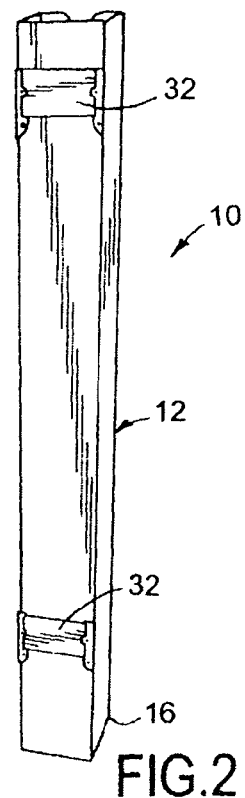
FIG. 2 is a rear perspective view illustrating the grow tube of the vertical hydroponic plant production apparatus of FIG. 1, constructed in accordance with the present invention.
Figure 3:
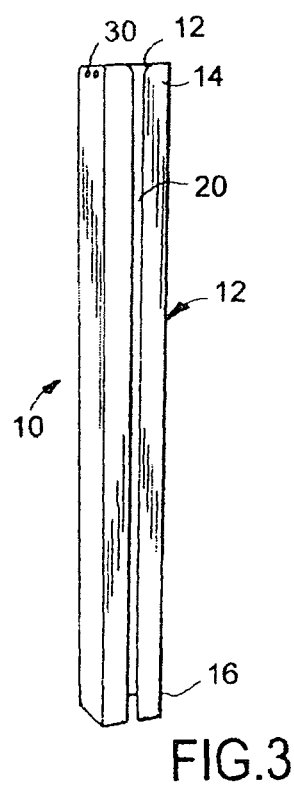
FIG. 3 is a front perspective view illustrating another embodiment of the grow tube of the vertical hydroponic plant production apparatus, constructed in accordance with the present invention.
Figure 4:
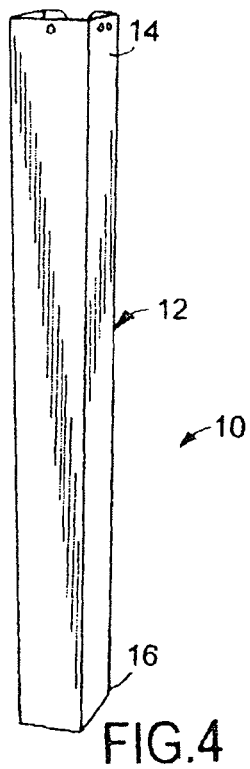
FIG. 4 is a rear perspective view illustrating the grow tube of the vertical hydroponic plant production apparatus of FIG. 3, constructed in accordance with the present invention.
Figure 5:
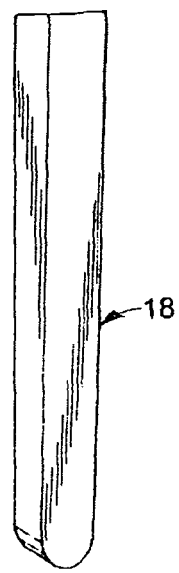
FIG. 5 is a front perspective view illustrating a media column of the vertical hydroponic plant production apparatus, constructed in accordance with the present invention.
Figure 6:
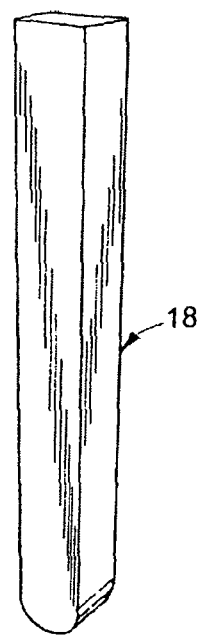
FIG. 6 is a rear perspective view illustrating the media column of the vertical hydroponic plant production apparatus of FIG. 5, constructed in accordance with the present invention.
Figure 7:
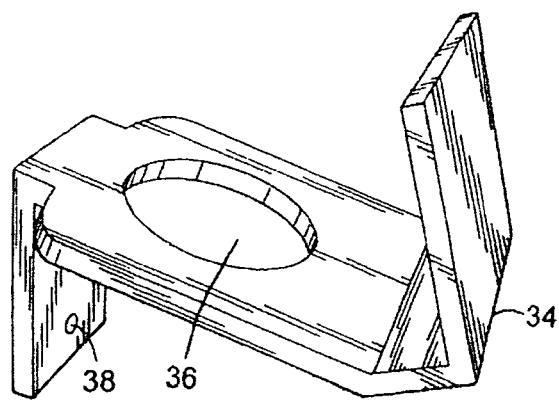
FIG. 7 is a perspective view illustrating a Z bracket of the vertical hydroponic plant production apparatus, constructed in accordance with the present invention.
Figure 8:
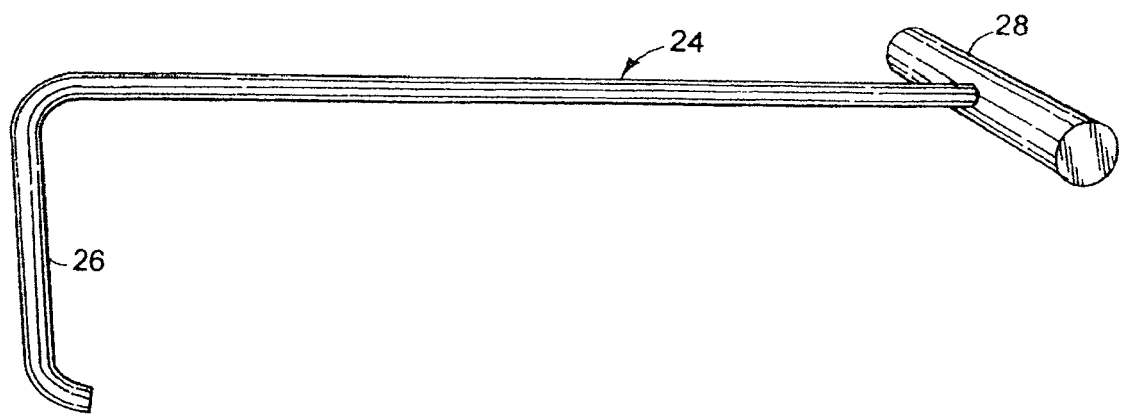
FIG. 8 is a perspective view illustrating a pulling hook of the vertical hydroponic plant production apparatus, constructed in accordance with the present invention.
Figure 9:
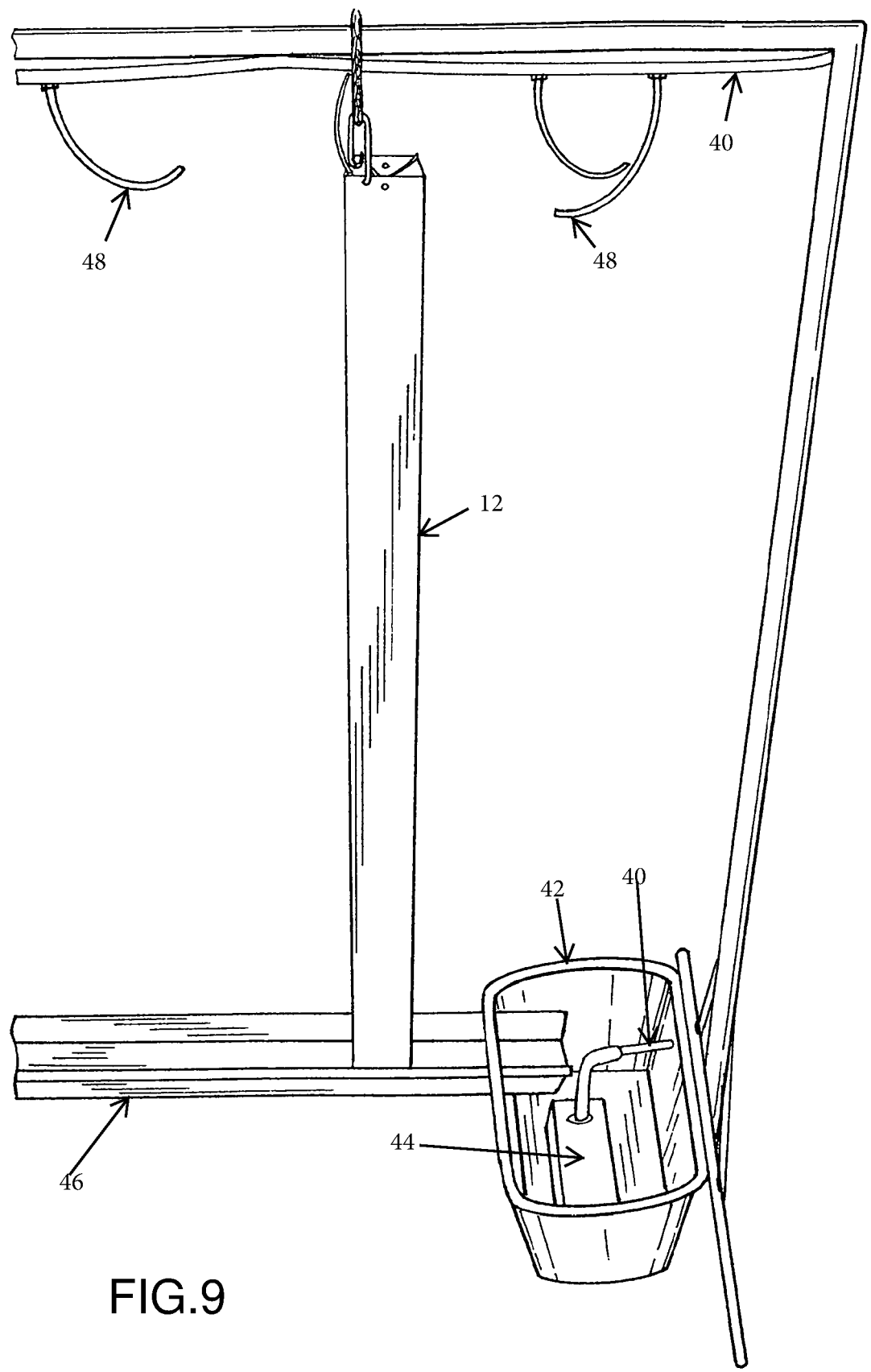
FIG. 9 illustrates a tower in relation to a nutrient solution reservoir, with a pump, one or more nutrient solution conduits, and one or more nutrient solution emitters.
Figure 10:
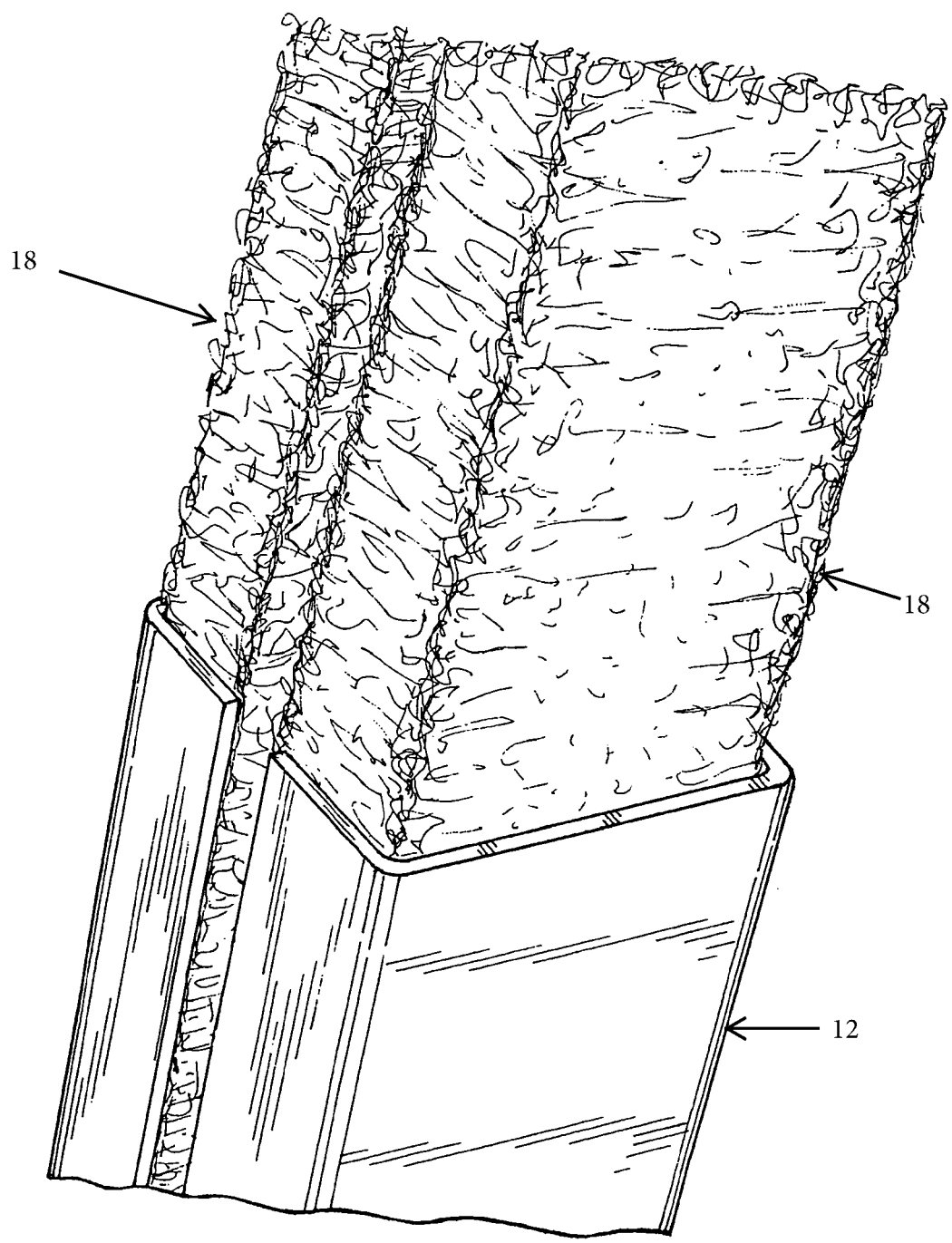
FIG. 10 illustrates a media matrix insert with two halves roughly the dimensions of the grow tube.

As illustrated in FIGS. 1-12, the present invention is a vertical hydroponic plant production apparatus, indicated generally at 10, allowing vertical hydroponic greenhouse crop production in a fraction of the space necessary for traditional plant production techniques and allows utilization of vertical surfaces for plant production.

The vertical hydroponic plant production apparatus 10 of the present invention includes a grow tube 12 useable in a horizontal position, vertical position, or any position between the horizontal position and the vertical position. The grow tube 12 is highly portable, being light, making it easy to move the grow tube 12 from area to area for transplant, grow out, and harvest. The grow tube 12 further allows inclined, multi-angled crop production and multi-storied conveyor style crop production. The grow tube 12 of the vertical hydroponic plant production apparatus 10 of the present invention also functions as aquacultural biofiltration/nutrient stripping devices for plant-based, high-efficiency waste nutrient removal and as sites nitrification processes, having massive surface area/volume thereby reducing the costs of single pass aquaculture and improving the efficiency of recirculating aquaculture.

The grow tube or tower 12 of the vertical hydroponic plant production apparatus 10 of the present invention also functions as in-store or at market display devices allowing the display of fresh, live produce for you-pick vegetable sales at market places and allowing the sale of produce that is more fresh than traditionally harvested vegetable products. Designed for easy affixation to the walls and/or roofs of buildings, the grow tube 12 reduces heating and cooling costs through shading and plant evapotranspiration and performs a decorative function. The grow tube 12 applied in such a manner can also reduce rooftop and hard surface water runoff depending on application and plumbing system.

Basically, the vertical hydroponic plant production apparatus 10 of the present invention allows for decorative landscape designs as well as vertical plant production displays indoors for a variety of purposes. The grow tubes or towers 12 can house aromatic and decorative species of herbs that may be used for aromatherapy type interactive hallways, lobby displays, kitchen, and cafeteria displays as well as common industrial plant displays in offices and workspaces.

The grow tube 12 of the vertical hydroponic plant production apparatus 10 of the present invention has a first end 14 and a second end 16 and is preferably a square, triangular, or angular tubing containing a non-woven matrix media 18 composed of any number of plastic materials, suspended vertically from the ceiling, supported by a framework, and/or standing upright on the floor using a support pole or frame. The media 18 is preferably a fibrous, non-woven, air laid media made of polyethylene plastic, although it can also be made of any type of plastic. The media 18 can be coated with a silicone binder to slow decomposition and reduce UV damage and is characterized by its high surface area to volume ratio, high shear strength, and durable yet flexible structure. The media 18 functions as a mechanical filter media as well as substrate for biological filtration. Because of the high shear strength, the media 18, can be cut into strips and used in hydroponic environments where long strips are pulled and stressed without tearing. Crop seeds can be seeded directly into the media 18, or can be incorporated into the media 18 as seedlings a variety of ways. Seedlings can be inserted into holes cut in the media 18, between two or more pieces of media 18, or can be germinated beneath the media 18, with shoots protruding through the media 18. The media 18 can be used in raft hydroponics, as a media substrate for media based hydroponics or as a plant anchor in NFT hydroponics. The media 18 is an excellent substrate for root development and protection, biological interactions, and soil and substrate stabilization. Once used for plant production, the media 18 contains a great deal of organic matter and holds water quite well. At this point the material introduces a number of water and nutrient holding and moderation capabilities. The media 18 is also excellent for supporting redworm (*Eisenia fetida*) colonies as well as diverse colonies of soil bacteria and fungi. The media 18 can be used as a substrate for algae production as well.

Preferably, the grow tube 12 the vertical hydroponic plant production apparatus 10 of the present invention is constructed of a PVC plastic material with side walls having a width of approximately four (4") inches to six (6") inches although constructing the grow tube from a different material with different widths is within the scope of the present invention. The grow tube 12 has a slot 20 formed lengthwise through the grow tube 12. The slot 20 can be formed along the entire face of the grow tube 12 from the first end 14 to the second end 16 or the slot 20 can be formed to a point approximately four (4") inches to approximately six (6") inches from the first end 14 of the grow tube 12. In the case of the slot 20 formed along the entire face of the grow tube 12, the slot 20 can have angled portions 22 at the first end 14 of the grow tube 12 allowing for easy insertion and removal of the media, as will be described further below. Preferably, the slot 20 has a width of approximately one-half (½") inch to approximately one and one-half (1½") inches although constructing the slot 20 with different widths is within the scope of the present invention.

As mentioned briefly above, the vertical hydroponic plant production apparatus 10 of the present invention has a media material 18 preferably constructed from a polyester matrix material approximately two (2") inches thick, cut to the internal width/diameter of the grow tube, and folded in the middle so that both halves together roughly equal the inside dimensions of the grow tube or tower housing 12. The media material 18 can also be composed of two halves of approximately two (2") inch thick media or one piece of four (4") inch thick media split down the middle to within approximately four (4") inches to approximately six (6") inches of the top of the media material where a bolt spans its width. In the bolt embodiment of the present invention, this bolt not only spans the width of the media insert 18, joining the two halves, and/or lending structural integrity to the media insert, but also anchors a handle or receiver to the media 18, allowing either the handle to be grasped for the purposes of inserting and removing the media 18 insert from the grow tube 12, or allowing a forked or hooked handle to be inserted into the receiver for the same purpose.

In the embodiment of the vertical hydroponic plant production apparatus 10 of the present invention where the media material 18 is folded in half, a pulling hook 24 with a flat hook 26 attached to a handle 28 allows the media inserts 18 to be pulled into and out of the grow tube 12, with the pulling hook handle 28 extending from the slot 20 in the grow tube 12. The hook 24 preferably consists of a piece of round bar metal bent to form a broad, flat, "L" shaped hook, roughly the width of the folded media 18 with a handle 28 affixed to the end. The hook 26 can also be attached to a pneumatic or hydraulic device that allows automated "pulling" of the media inserts 18.

For planting, seedlings are placed between the two halves of media 18 of the vertical hydroponic plant production apparatus 10 of the present invention, with the upper portions out, and are "zipped" into the grow tubes 12 with the upper portions of the plant protruding through the gap in the tower housing 12. The top of the grow tube 12 can be capped with a removable cap having holes of variable sizes drilled in the center, or may not be capped at all. If capped, a mister or irrigation tubing is inserted through the hole in the cap hole. The bottom of the grow tube 12 is either submerged in nutrient solution, rests in a drain or trough 46 for recirculating nutrient solution, or fits into a lower pipe. A pump 44 moves nutrient solution from a nutrient solution reservoir 42 to the mister or irrigation pipe 40 at the top of the grow tube 12, where the nutrient solution is emitted 48 and allowed to drip down through the media 18 and plant roots. Some of the nutrient solution trickles down the walls of the pipe 12 and is captured by roots in contact with the pipe wall. Excess nutrient solution drains to the bottom of the pipe 12 where it is drained back to the nutrient solution reservoir 42. High humidity is maintained within the grow tube due to the constant trickling/misting of nutrient solution. The height of the plant grow tube 12 is variable dependent on greenhouse height, and the spacing for plants is variable dependent on plant type and desired spacing. It is possible to stack grow tubes 12 on top of each other to vary height, by fitting the bottoms of the grow tubes 12 with coupling caps, to utilize conveyor production techniques.

The grow tubes 12 of the vertical hydroponic plant production apparatus 10 of the present invention can be fixed in place using hangers, rope, or strap and metal hooks that loop over a support beam or bracket and secure to the grow tube 12 or tower through holes 30 drilled at the first end of the grow tube 12. The holes 30 can be of variable size and placement depending on application, although in the most common embodiment, there are four holes 30, one pair centered on either side of the housing upper, and one pair forward (towards the front of the grow tube 12) of the centered pair allowing slight inclination of the hanging tower 12 if inclined growing is desired. The grow tubes 12 can also be fixed in place using a series of holes or a gap cut in the grow tube 12 allowing the grow tube to be fixed to a pole having a bracket or pressure or spring action hanging system attached to it. The grow tube 12 can also be inclined on said pole or hanging system for the purpose of inclined production.

The grow tube 12 of the vertical hydroponic plant production apparatus 10 of the present invention can also be secured to a support pole utilizing a system of metal brackets whereas one bracket type is female and is designated as an "H" bracket 32 and the other bracket type is male and is designated as a "Z" bracket 34. The female "H" bracket 32 has a receiving portion and an anchoring portion to bolt to the back or side of the tower 12. The male "Z" bracket 34 consists of a vertical, upward facing tongue portion that fits into the receiving portion of the female bracket 32, and has a hole 36 through the middle, angled portion of the bracket 34 which fits over a support pole. The rear, downward facing vertical portion of the bracket 34 has a hole 38 drilled midway across the bottom of the bracket 34 and is threaded to receive a bolt. As weight is applied to the tongue portion of the bracket 34 through the placement of a bracketed tower, downward torque is applied across the "Z" bracket 34 causing a clutch action to affix the bracket tightly to the support pole. The torque attachment of this "Z" bracket 34 can be enhanced by tightening the bolt threaded into the rear of the bracket 34 against the support pole, applying even more pressure for bracket attachment.

The media insert 18 of the vertical hydroponic plant production apparatus 10 of the present invention can also be altered in several ways to serve a diverse range of functions. The media 18 can be cut at a taper from the unfastened or unfolded end to the fastened or folded end, reserving a tapered space at the rear of the insert to allow compost, alternate plant media, fertilizing substance or some type of soil amendment or additive to be held in the space between the tapered media insert and the rear and sidewalls of the tower housing 12. This alteration allows compost based hydroponic plant production using regular irrigation water, with plant nutrients supplied by the compost or other additive. Tops, sides, and corners of the media insert 18 can also be cut, rounded, or cut at an angle to reduce biosolids accumulation, algal growth, or to enhance water distribution through the media 18, depending on application. Multiple inserts 18 can also be used in towers 12 allowing multiple age groups of plants to incorporated into each grow tube 12. Worms are also commonly integrated into the grow tubes 12 and the media is designed to have the correct mesh size to accommodate their movement through the media 18, although media 18 with a smaller or larger mesh size may be used depending on application.

The vertical hydroponic plant production apparatus 10 of the present invention is comparatively lightweight, inexpensive to manufacture (being based on common PVC extrusion techniques) and existing polyethylene matrix material production, will not clog with nutrient solution, and requires much less labor to operate. The present invention can also be converted to more traditional horizontal production techniques if desired, eliminating the risk inherent in changing production techniques for commercial producers.

In addition, traditional nitrogen and phosphorus removal techniques in aquaculture are very poor compared to removal using plant uptake for phytoremediation. Plants are able to remove N and P to levels an order of magnitude lower than any mechanical/chemical/microbial technique currently in use. The present invention phytoremediates water allowing for prolonged water use/recirculation and water conservation.

The vertical hydroponic plant production apparatus 10 of the present invention is an improvement on traditional harvesting and sales models where production systems are physically removed from the sales systems and shipping and handling results in a large percentage of producer losses, both financially as wasted or expired produce. By selling live plants, there is no spoilage and shipping and handling is done partially by producers moving towers to market places, but primarily by consumers who are interested in fresh produce and the experience of picking and harvesting vegetables, herbs and greens for their own use. The grow tubes are easily transported and easy to stack, lift, and slide onto shelves. They essentially operate as a packaging system as well as a plant production system. Further, by utilizing individual towers, landscape designers and home users can scale their display or production system exactly to their specifications.

The vertical hydroponic plant production apparatus 10 of the present invention reduces necessary growing space tremendously. Typical reductions in growing space utilizing a vertical aeroponic technique have varied between 60% and 85% compared to conventional growth methods. Greenhouse growing space is very expensive, so the ability to increase crop size without increasing greenhouse space could prove very profitable. The present invention is also very affordable to manufacture, building on existing PVC pipe production infrastructure. Implementation of the present invention will also be simple, building on current hydroponic production technology.

The increased water recirculation time achieved with the vertical hydroponic plant production apparatus 10 of the present invention can eliminate one of the high costs and reduce the negative environmental effects of aquaculture, resulting in increased profits and a better industry image for aquacultural producers. Using the present invention can also allow aquacultural producers to diversify their product base and/or grow supplementary feed products (depending on the dietary needs of the fish).

The vertical hydroponic plant production apparatus 10 of the present invention has the potential to open up an entirely new system of production, transportation, shipping, handling, and display to vegetable producers, retailers, and consumers. This can result in fresher produce, a more pleasant customer shopping experience, reduced waste, reduced handling and packaging costs, fewer food miles, less plastic and packaging material consumption, and longer shelf life of purchased produce.

The vertical hydroponic plant production apparatus 10 of the present invention can be used by industrial institutions for phytoremediation of waste waters, using the towers as trickling, plant integrated filters for the removal of waste materials, and the remediation of waste waters for discharge.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

What is claimed is:

1. A vertical hydroponic plant production apparatus, the apparatus comprising:
    a plurality of hollow grow tubes positioned adjacent to each other;
    wherein said grow tubes have a front face, a back face, a right face, a left face opposing said right face, a first end, and an open second end opposing said first end, wherein said grow tube has a length, a width and an internal width, and wherein said width is between four (4") inches and six (6") inches, the length of each grow tube is larger than the width of the front face; and
    wherein said grow tubes have a slot formed in the front face, wherein said slot is formed continuously along the entire length of the front face of the grow tubes and wherein said slot has a width between one-half (½") inch and one and one-half (1½") inches; and
    one or more matrix media inserts, wherein each matrix media insert is composed of a plastic, fibrous, non-woven matrix media material and wherein the media material is coated in a binding material to slow decomposition and reduce UV damage, wherein each matrix media insert is cut to the internal width and length of each of said grow tubes, wherein the matrix media insert is capable of being posited into two equal lengths so that the thickness of both lengths of said matrix media insert are approximately equal to the internal width of the grow tube;
    wherein said plurality of grow tubes are adapted to receive said matrix media inserts, and wherein said matrix media inserts are supported by the faces of the grow tubes; and
    wherein the first end of each grow tube is configured to be positioned vertically higher than the open second end;
    wherein said plurality of grow tubes allows plants to be inserted between both lengths of said matrix media insert through said slot;
    at least one pump;
    one or more nutrient solution conduits, wherein said at least one pump is operably coupled to said one or more nutrient solution conduits;
    two or more nutrient solution emitters, wherein said two or more nutrient solution emitters are operably coupled to said one or more nutrient solution conduits, wherein each of said two or more nutrient solution emitters are positioned above each grow tube in order to allow nutrient solutions to drip into and through each grow tube;
    a drain or trough, wherein said drain or trough collects nutrient solutions from said plurality of grow tubes; and
    at least one reservoir, wherein said at least one pump is capable of circulating nutrient solutions from said at least one reservoir to the plurality of hollow grow tubes through said one or more nutrient solution conduits and emitting said nutrient solutions from said two or more nutrient solution emitters into said plurality of hollow grow tubes such that said nutrient solutions pass through the matrix media inserts, into said drain or trough and into the at least one reservoir through the open second end of each of said plurality of hollow grow tubes.

2. The apparatus of claim 1, wherein said two lengths of said matrix media insert contact each other when inserted into each of the grow tubes.

3. The apparatus of claim 1, further comprising a means for supporting said matrix media insert within each of said grow tube.

4. The apparatus of claim 1, wherein the matrix media insert media is supported by the grow tube and said drain or trough.

5. The hydroponic plant growth apparatus of claim 1, wherein said binding material coating said matrix media insert is a silicone binder.

6. A method of growing a plant in a vertical hydroponic plant production apparatus, the apparatus comprising:
    providing a plurality of hollow grow tubes positioned adjacent to each other;
    wherein said grow tubes have a front face, a back face, a right face, a left face opposing said right face, a first end, and an open second end opposing said first end,
    wherein said grow tubes have a length and a width and wherein said front face has a width; and
    wherein said grow tubes have a slot formed in the front face of the grow tube, wherein said slot is formed continuously along the entire length of the front face the grow tube and wherein said slot has a width between one-half (½") inch and one and one-half (1½") inches; and
    providing one or more matrix media inserts, wherein each matrix media insert is composed of a plastic, fibrous, non-woven matrix media material and wherein the media material is coated in a binding material to slow decomposition and reduce UV damage, wherein each matrix media insert is cut to the internal width and length of each of said grow tubes, wherein the matrix media insert is capable of being posited into two equal lengths so that the thickness of both lengths of said matrix media insert are approximately equal to the internal width of the grow tube and wherein the matrix media insert is capable of receiving one or more plants into said matrix media insert and capable of allowing said one or more plants to root and grow in said matrix media insert;
    wherein said plurality of grow tubes are adapted to receive said matrix media insert, and wherein said matrix media insert is supported by the faces of the grow tube; and
    wherein the first end of each grow tube is configured to be positioned vertically higher than the open second end;
    wherein said plurality of grow tubes are positionable in a vertical position or semi-vertical position;
    providing at least one pump;
    providing one or more nutrient solution conduits, wherein said at least one pump is operably coupled to said one or more nutrient solution conduits;
    providing two or more nutrient solution emitters, wherein said two or more nutrient solution emitters are operably coupled to said one or more nutrient solution conduits;
    providing a drain or trough, wherein said drain or trough collects nutrient solutions from said plurality of grow tubes; and
    providing at least one reservoir, wherein said at least one pump is capable of circulating nutrient solutions from said at least one reservoir to the plurality of hollow grow tubes through said one or more nutrient solution conduits and emitting said nutrient solutions from said two or more nutrient solution emitters into the plurality of hollow grow tubes such that said nutrient solutions pass through the matrix media insert and into the at least one reservoir through the open second end of the plurality of hollow grow tubes.

7. The method of growing a plant of claim 6, further comprising a means for supporting said matrix media insert within said grow tube.

8. The method of growing a plant of claim 6, wherein the matrix media insert are supported by the grow tube and said drain or trough.

9. The method of claim 6, wherein said binding material coating said matrix media insert is a silicone binder.

* * * * *